(12) United States Patent
Toles et al.

(10) Patent No.: US 8,582,284 B2
(45) Date of Patent: Nov. 12, 2013

(54) MEDIA DISPLAY FIXTURE FOR AN ELECTRONIC KIOSK

(75) Inventors: Katia L. J. Toles, Minneapolis, MN (US); Tracy M. Tonnessen, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 339 days.

(21) Appl. No.: 13/033,038

(22) Filed: Feb. 23, 2011

(65) Prior Publication Data
US 2012/0212885 A1 Aug. 23, 2012

(51) Int. Cl.
*H05K 7/12* (2006.01)
(52) U.S. Cl.
USPC .............. 361/679.25; 361/679.01; 248/309.1; 248/220.21; 248/224.8
(58) Field of Classification Search
USPC ............ 361/679.01, 679.02, 679.25, 679.23, 361/679.08, 679.09, 679.26, 679.27, 361/679.22; 312/223.1–223.2; 249/917–924; 248/917–924, 309.1, 248/220.21, 224.8
See application file for complete search history.

(56) References Cited

U.S. PATENT DOCUMENTS

| | | | |
|---|---|---|---|
| D167,162 S | 7/1952 | Polledo | |
| 4,475,705 A * | 10/1984 | Henneberg et al. | 248/447.2 |
| 4,869,565 A | 9/1989 | Bachman | |
| 4,960,257 A * | 10/1990 | Waters | 248/442.2 |
| 5,104,087 A | 4/1992 | Wentzloff et al. | |
| 5,125,612 A * | 6/1992 | McNeal | 248/442.2 |
| 5,271,593 A | 12/1993 | Kinner et al. | |
| 5,533,702 A | 7/1996 | Koch | |
| 5,564,209 A | 10/1996 | Zagnoli | |
| D392,682 S | 3/1998 | Johnston et al. | |
| 5,725,191 A | 3/1998 | Nemeth | |
| 5,769,374 A * | 6/1998 | Martin et al. | 248/221.11 |
| 5,850,998 A * | 12/1998 | Parsey et al. | 248/223.21 |
| 5,881,986 A | 3/1999 | Hegarty | |
| 5,890,309 A | 4/1999 | Markarian | |
| 5,901,937 A | 5/1999 | Compeau et al. | |
| 5,988,582 A | 11/1999 | Olivo | |
| D445,109 S | 7/2001 | Tracy | |
| D447,750 S | 9/2001 | Bell | |
| 6,412,744 B1 | 7/2002 | Wollam et al. | |
| D461,190 S | 8/2002 | Bell | |
| D471,200 S | 3/2003 | Bell | |
| 6,533,236 B1 | 3/2003 | MacLellan et al. | |
| 6,543,168 B1 | 4/2003 | Moore | |
| 6,594,144 B1 | 7/2003 | Miles | |
| 6,851,656 B2 | 2/2005 | Bauman et al. | |
| D508,054 S | 8/2005 | Ramsey | |
| D547,757 S | 7/2007 | Koo | |
| 7,325,340 B2 | 2/2008 | Chen | |
| 7,334,768 B1 * | 2/2008 | Lum | 248/444 |

(Continued)

*Primary Examiner* — Jinhee Lee
*Assistant Examiner* — Ingrid Wright
(74) *Attorney, Agent, or Firm* — Leanne Taveggia Farrell; Westman, Champlin & Koehler, P.A.

(57) ABSTRACT

A media display fixture includes a main body, a bracket and at least one first fastener. The main body includes a first side portion, a second side portion and a central portion coupling the first side portion to the second side portion. The central portion includes a ring binder for receiving media for display. The bracket includes a first side portion, a second side portion and a central portion coupling the first side portion to the second side portion. The at least one first fastener directly couples one of the first and second side portions of the main body to one of the first and second side portions of the bracket.

19 Claims, 12 Drawing Sheets

(56) References Cited

U.S. PATENT DOCUMENTS

| | | |
|---|---|---|
| 7,340,855 B2 | 3/2008 | Wiltfang et al. |
| 7,611,117 B1 | 11/2009 | Lang, Jr. |
| 7,681,856 B1 | 3/2010 | Thomas et al. |
| D621,407 S | 8/2010 | Simonsen |
| D624,323 S | 9/2010 | Simonsen |
| 7,823,856 B2 * | 11/2010 | Schwartz et al. .......... 248/442.2 |
| 2002/0066846 A1 | 6/2002 | Giulie et al. |
| 2004/0031899 A1 | 2/2004 | Costa et al. |
| 2006/0091280 A1 | 5/2006 | Rothschild |
| 2007/0119079 A1 | 5/2007 | Dill |

* cited by examiner

MEDIA DISPLAY FIXTURE FOR AN ELECTRONIC KIOSK

BACKGROUND

An electronic kiosk houses a computing device having a display and a means of accepting user input. Kiosks are placed in high foot traffic settings and allow a user to perform a wide variety of self-service activities. For example, Internet kiosks provide users public Internet access, ticketing kiosks provide users with the ability to purchase tickets for specific services, such as travel and etc., vending kiosks provide users with products for purchase or rental and photo kiosks allow users to print pictures from digital images and/or order photo prints and other photographic products.

The discussion above is merely provided for general background information and is not intended to be used as an aid in determining the scope of the claimed subject matter.

SUMMARY

A media display fixture includes a main body, a bracket and at least one first fastener. The main body includes a first side portion, a second side portion and a central portion coupling the first side portion to the second side portion. The central portion includes a ring binder for receiving media for display. The bracket includes a first side portion, a second side portion and a central portion coupling the first side portion to the second side portion. The at least one first fastener directly couples one of the first and second side portions of the main body to one of the first and second side portions of the bracket.

In one embodiment, the main body of the media display fixture is formed of a single, continuous material and the bracket is formed of a single, continuous material. The main body includes a right side edge, a first bend edge spaced apart from and substantially parallel with at least a portion of the right side edge such that the right side edge and the first bend edge define the first side portion, a second bend edge spaced apart from and substantially parallel with the first bend edge such that the first bend edge and the second bend edge define the central portion, a left side edge spaced apart from and substantially parallel with at least a portion of the second bend edge such that the second bend edge and the left side edge define the second side portion. The bracket of the media display fixture includes a right side edge, a first bend edge spaced apart from and substantially parallel with at least a portion of the right side edge such that the right side edge and the first bend edge define the first side portion, a second bend edge spaced apart from and substantially parallel with the first bend edge such that the first bend edge and the second bend edge define the central portion, a left side edge spaced apart from and substantially parallel with at least a portion of the second bend edge such that the second bend edge and the left side edge define the second side portion.

A method of displaying media on an electronic kiosk is also provided. It is determined whether to mount the media display fixture on a left side or a right side of a kiosk display monitor of the electronic kiosk. Using the at least one first fastener, one of the first and second side portions of the media display fixture is directly coupled to one of the first and second side portions of the bracket depending on whether the media display fixture is to be mounted on the left side or the right side of the kiosk display monitor. The central portion of the bracket is mounted to a back surface of the kiosk display monitor using at least one second fastener.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Embodiments are described as a media display fixture for mounting to an electronic kiosk. More specifically, the media display fixture includes multiple components coupled together for supporting a flipbook that includes pages of information for access by a user. In particular, the media display fixture includes a main body, a bracket and a pair of first fasteners. The bracket and the main body are designed to couple together using the at least one first fastener to form the media display fixture. In addition, the main body and the bracket are designed to allow the bracket to be coupled to either side of the main body and therefore allow the bracket to be mounted to either side of the electronic kiosk with at least one second fastener.

An electronic kiosk houses a computing device having a display and a means of accepting user input. In particular, electronic kiosks can be placed in retail stores to perform a variety of self-service activities including, for example, providing a self-service point-of-sale (POS) system. In another application, photo electronic kiosks can be placed in retail stores to perform a variety of photo-making activities. For example and based on user input, such electronic kiosks can print pictures from digital images and/or order and pay for photo prints and other photographic products.

Figure 1:
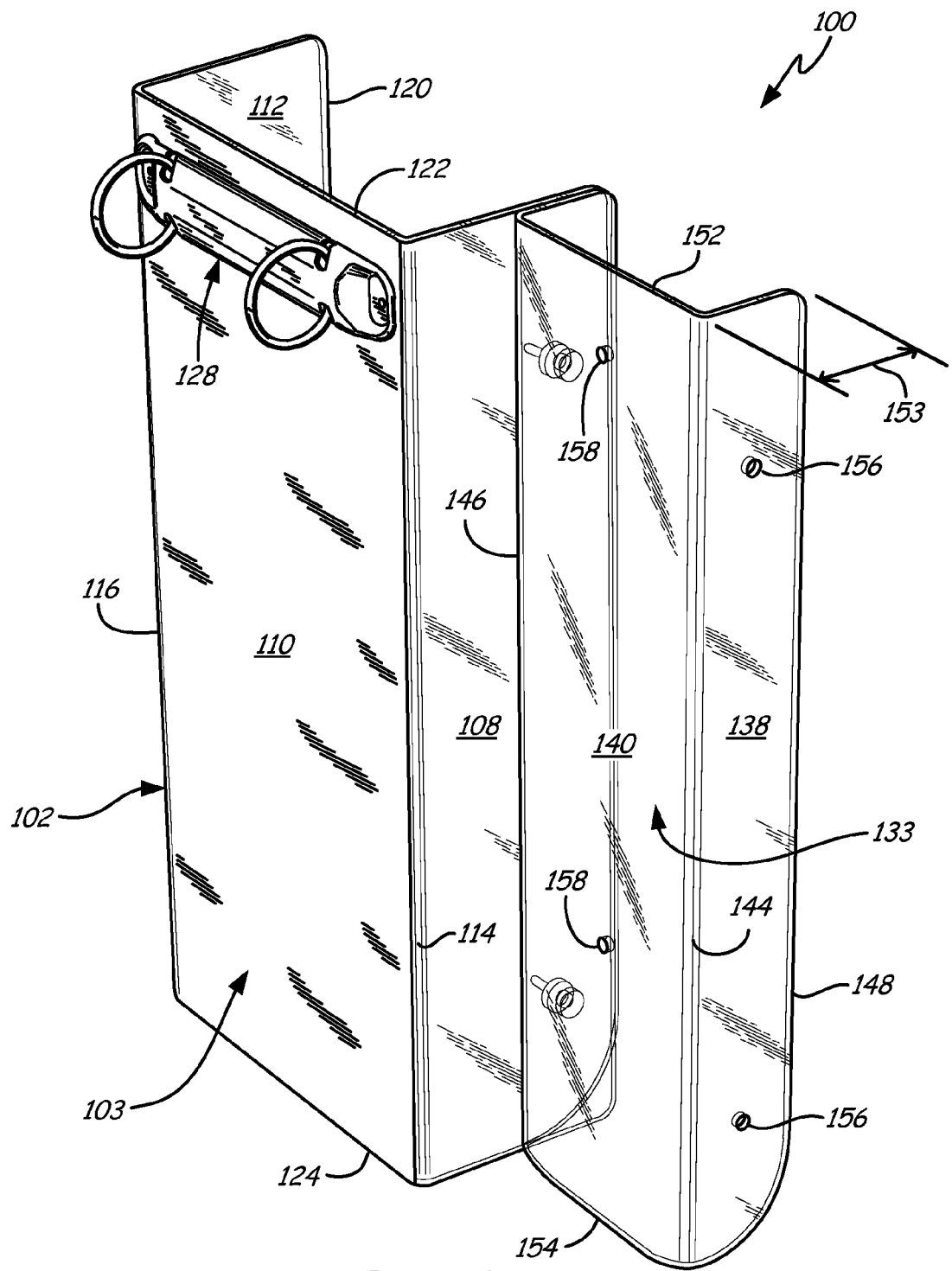
FIG. 1 illustrates a perspective view of a media display fixture in accordance with one embodiment.
Figure 2:
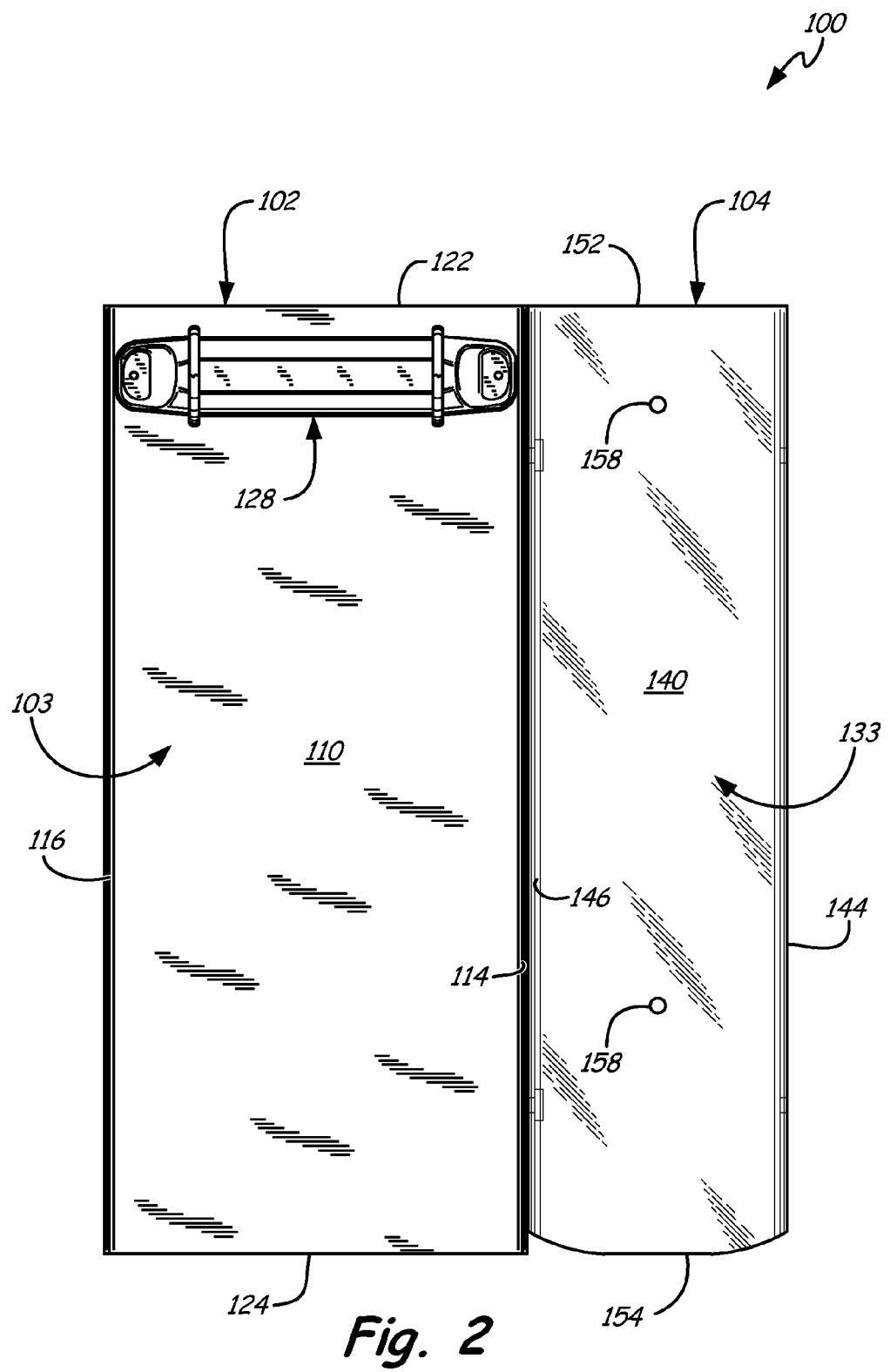
FIG. 2 illustrates a front view of the media display fixture illustrated in FIG. 1.
Figure 3:
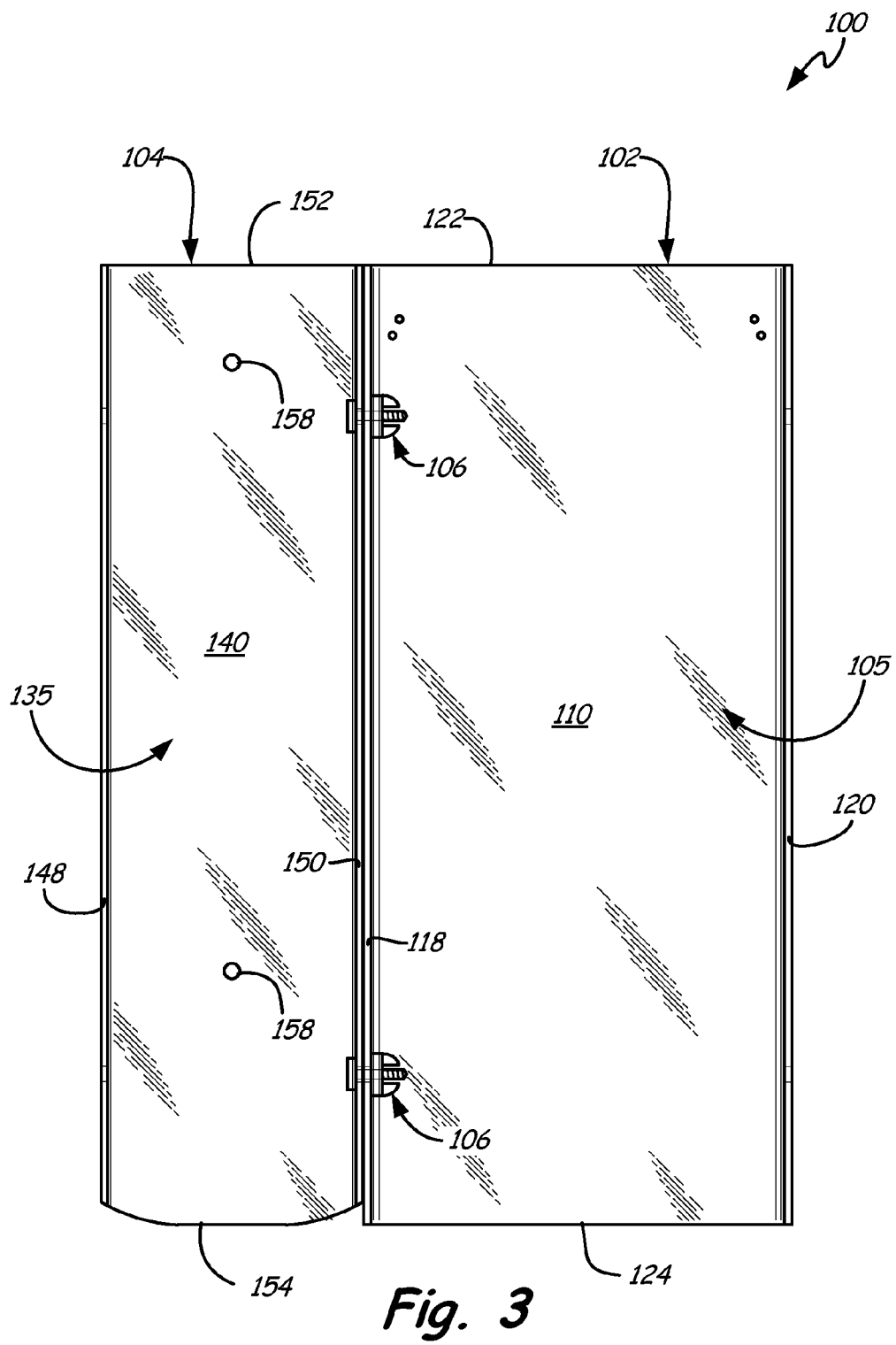
FIG. 3 illustrates a back view of the media display fixture illustrated in FIG. 1.
Figures 4, 5:
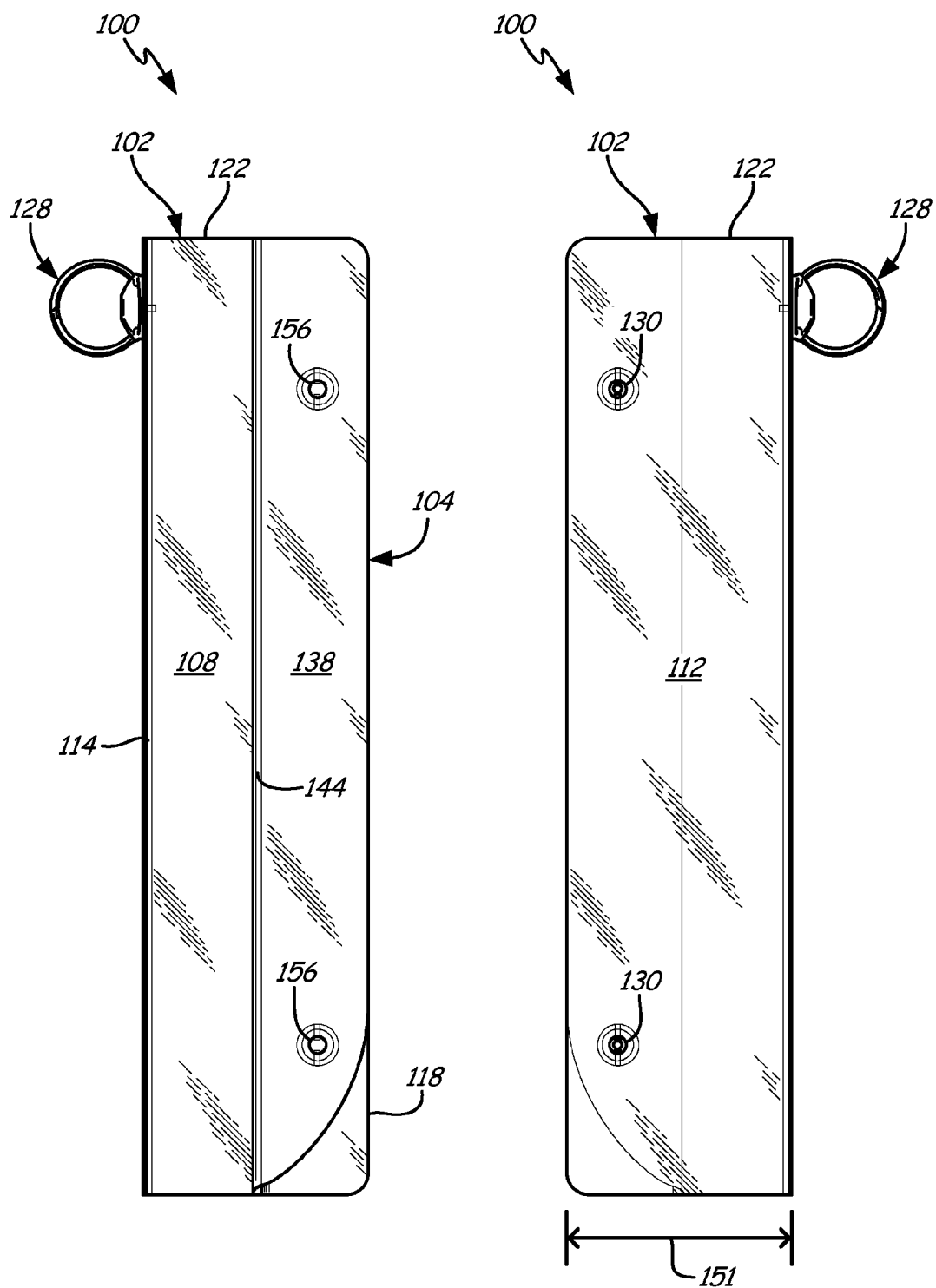
FIG. 4 illustrates a right side view of the media display fixture illustrated in FIG. 1.
FIG. 5 illustrates a left side view of the media display fixture illustrated in FIG. 1.

FIG. 1 is a perspective view of an assembled media display holder or media display fixture 100 in accordance with one embodiment. FIGS. 2-7 illustrate elevation views of the assembled media display holder 100 including front, back, right side, left side, top and bottom views. Media display holder 100 includes a main body or media display body 102, a bracket or support body 104 and a pair of first fasteners 106. In FIGS. 1-7, pair of fasteners 106 secure or couple main body 102 and bracket 104 together.

Main body 102 includes a front surface 103 and a back surface 105 and bracket 104 includes a front surface 133 and a back surface 135. Each of main body 102 and bracket 104 are made of plastic, such as polyethylene terephthalate glycol (PETG). In one embodiment, at least a portion of the front surface 103 or the back surface 105 of main body 102 are printed so as to make the main body 102 opaque, while bracket 104 is made of a transparent plastic and not printed. For example, the printing on main body 102 may be a wood grain decoration. However, main body 102 and bracket 104 may be other types of materials including other types of plastics, whether opaque or transparent.

In one embodiment and as illustrated in FIGS. 1-7, main body 102 is made of a single, continuous material, such as the plastic material discussed above. However, in other embodiments, main body 102 may be formed of multiple pieces of material. As illustrated in FIGS. 1-7, main body 102 includes a first side panel or portion 108, a second side panel or portion 112 and a central panel or portion 110 coupling the first side panel 108 to the second side panel 112. Main body 102 also includes a first bend edge 114, a second bend edge 116, a right side edge 118, a left side edge 120, a top edge 122 and a bottom edge 124. As illustrated, first bend edge 114, second bend edge 116, right side edge 118 and left side edge 120 are all substantially perpendicular to both top edge 122 and bottom edge 124. More particularly, each of right side edge 118 and left side edge 120 intersect with top edge 122 and bottom edge 124 at a rounded or curved corner having a radius of curvature.

Figure 6:
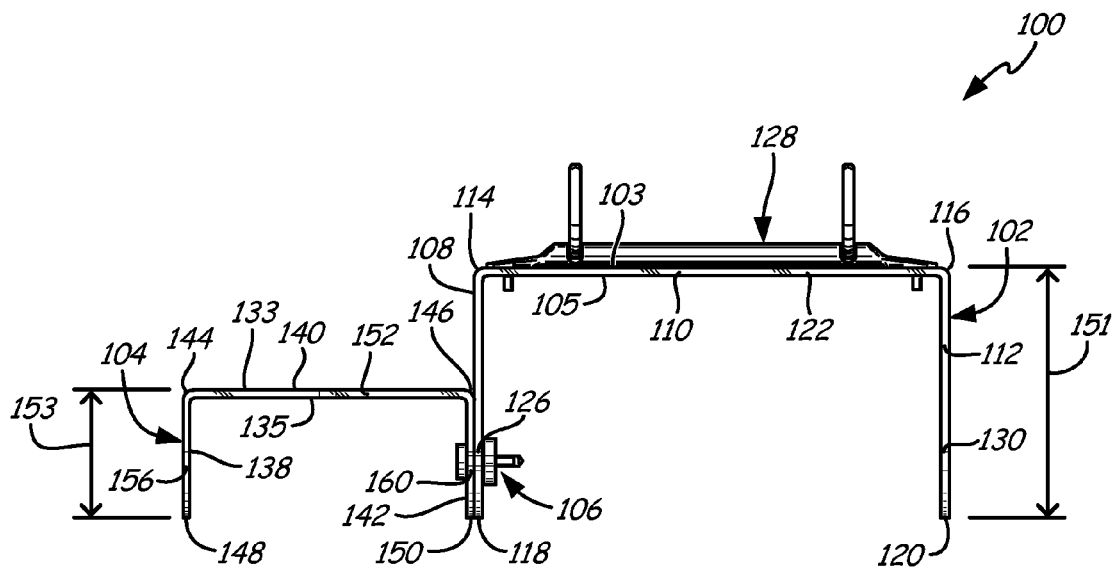
FIG. 6 illustrates a top view of the media display fixture illustrated in FIG. 1.
Figure 7:
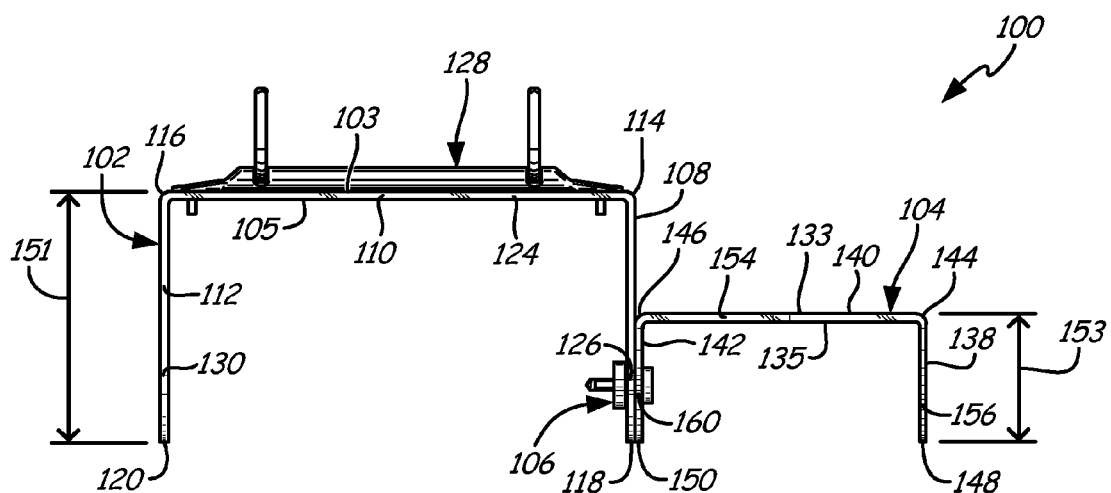
FIG. 7 illustrates a bottom view of the media display fixture illustrated in FIG. 1.

First bend edge 114 is spaced apart from and substantially parallel with at least a portion of right side edge 118 such that right side edge 118, first bend edge 114, top edge 122 and bottom edge 124 define first side panel or portion 108 of main body 102. In the embodiment illustrated in FIGS. 1-7, first side panel 108 includes a pair of spaced apart apertures 126 (FIGS. 6-7) that extend between front surface 103 and back surface 105. First bend edge 114 is spaced apart from and substantially parallel with second bend edge 116 such that first bend edge 114, second bend edge 116, top edge 122 and bottom edge 124 define central panel 110 of main body 102. Central panel 110 of main body 102 includes a ring binder 128 for receiving media or for receiving or supporting pages of a flipbook for display. Ring binder 128 is mounted to front surface 103 of central panel 110 by riveting portions of the ring binder 128 to central panel 110 as illustrated in FIGS. 6 and 7. In one embodiment, ring binder 128 is positioned proximate top edge 122. Second bend edge 116 is spaced apart from and substantially parallel with at least a portion of left side edge 120 such that second bend edge 116, left side edge 120, top edge 122 and bottom edge 124 define second side panel or portion 112 of main body 102. In the embodiment illustrated in FIGS. 1-7, second side panel 112 includes a pair of spaced apart apertures 130 (FIGS. 5-7) that extends between front surface 103 and back surface 105.

In one embodiment and as illustrated in FIGS. 1-7, bracket or support body 104 is made of a single, continuous material, such as the plastic material discussed above. However, in other embodiments, bracket 104 can be formed of multiple pieces of material. As illustrated in FIGS. 1-7, bracket 104 includes a first side panel or portion 138, a second side panel or portion 142 and a central panel or portion 140 coupling the first side panel 138 to the second side panel 142. Bracket 104 also includes a first bend edge 144, a second bend edge 146, a right side edge 148, a left side edge 150, a top edge 152 and a bottom edge 154. As illustrated, first bend edge 144, second bend edge 146, a portion of right side edge 148 and a portion of left side edge 150 are all substantially perpendicular to top edge 152. More particularly, each of right side edge 148 and left side edge 150 intersect with top edge 152 at a rounded or curved corner having a radius of curvature. Unlike main body 102, first bend edge 144, second bend edge 146, right side edge 148 and left side edge 150 are neither completely substantially perpendicular to bottom edge 154 nor intersect with bottom edge 154 at rounded corners. Rather, bottom edge 154 has a partially convex-shaped curved edge that traverses across only central panel 140, while portions of right side edge 148 and left side edge 150 have convex-shaped curved edges that intersect with bottom edge 154 at first bend edge 144 and second bend edge 146, respectively.

First bend edge 144 is spaced apart from and substantially parallel with at least a portion of right side edge 148 such that right side edge 148, first bend edge 144 and top edge 152 define first side panel or portion 138 of bracket 104. In the embodiment illustrated in FIGS. 1-7, first side panel 138 includes a pair of spaced apart apertures 156 (FIGS. 1, 4 and 6-7) that extend between front surface 133 and back surface 135. First bend edge 144 is spaced apart from and substantially parallel with second bend edge 146 such that first bend edge 144, second bend edge 146 and top edge 152 define central panel or portion 140 of bracket 104. In the embodiment illustrated in FIGS. 1-7, central panel 140 includes a pair of spaced apart apertures 158 (FIGS. 1-3) that extend between front surface 133 and back surface 135. Second bend edge 146 is spaced apart from and substantially parallel with at least a portion of left side edge 150 such that second bend edge 146, left side edge 150 and top edge 152 define second side panel 142 of bracket 104. In the embodiment illustrated in FIGS. 1-7, second side panel 142 includes a pair of spaced apart apertures 160 (FIGS. 6-7) that extend between front surface 133 and back surface 135.

As illustrated in FIGS. 1-7, spaced apart apertures 160 in second side panel 142 of bracket 104 are positioned into alignment with spaced apart apertures 126 in first side panel 108 of main body 102. The pair of first fasteners 106, such as viking clips (i.e., plastic wing nuts that removably receive round head screws), couples bracket 104 to main body 102 through apertures 126 and 160. Therefore, in FIGS. 1-7, surface 103 of first side panel 108 of main body 102 directly couples to or engages with surface 133 of second side panel 142 of bracket 104. In addition, right side edge 118 of main body 102 and a portion of left side edge 150 of support bracket 104 align with each other. As illustrated in FIGS. 1 and 5-7, main body 102 includes a width 151 and bracket 104 includes a width 153. The width 151 of main body 102 is greater than width 153 of bracket 104. With right side edge 118 and left side edge 150 being in alignment and the width 151 being greater than width 153, second side panel 142 of support bracket 104 only spans a portion of the width 151 of first side panel 108 of main body 102.

Figure 8:
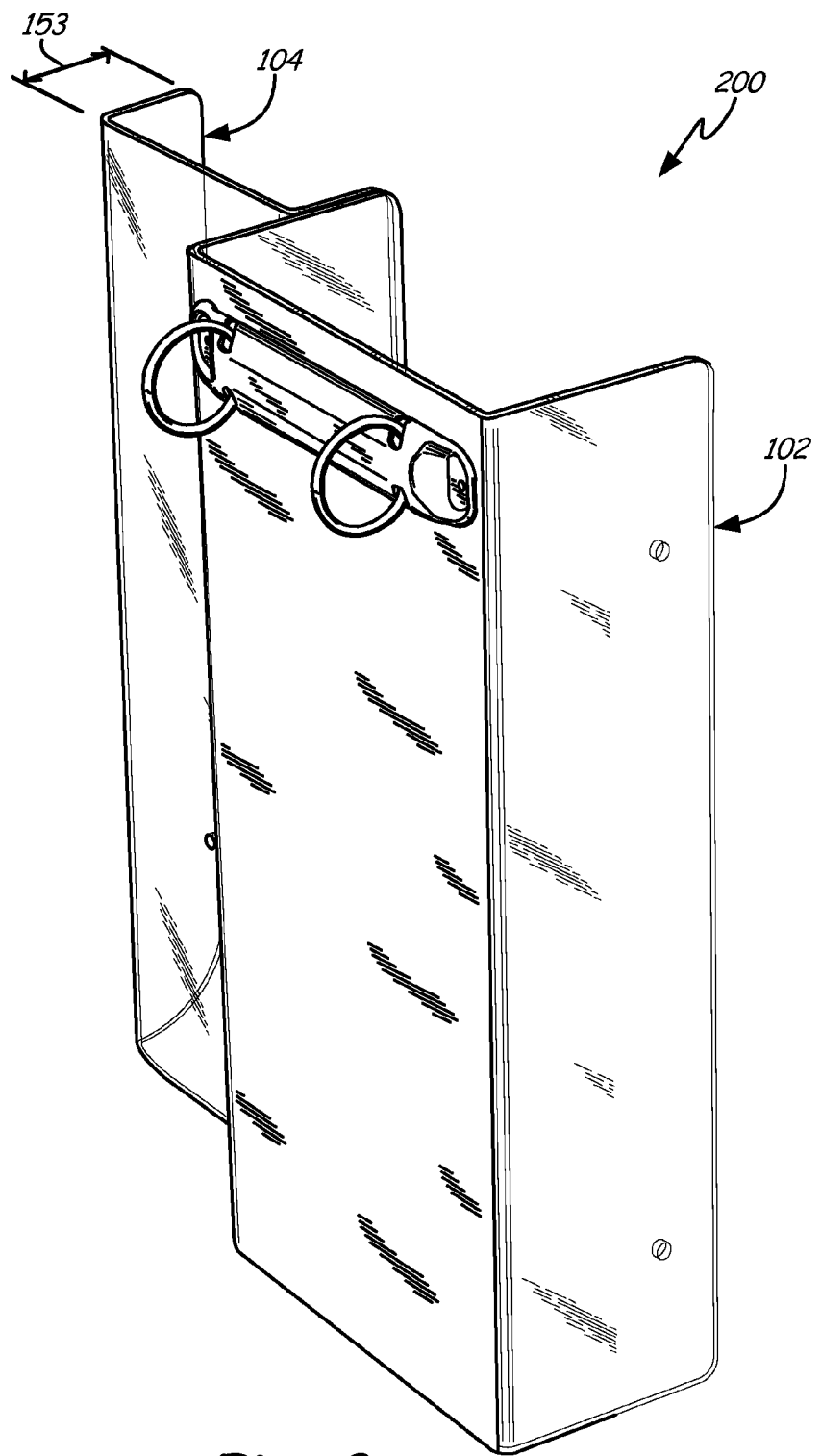
FIG. 8 illustrates a perspective view of a media display fixture in accordance with another embodiment.
Figure 9:
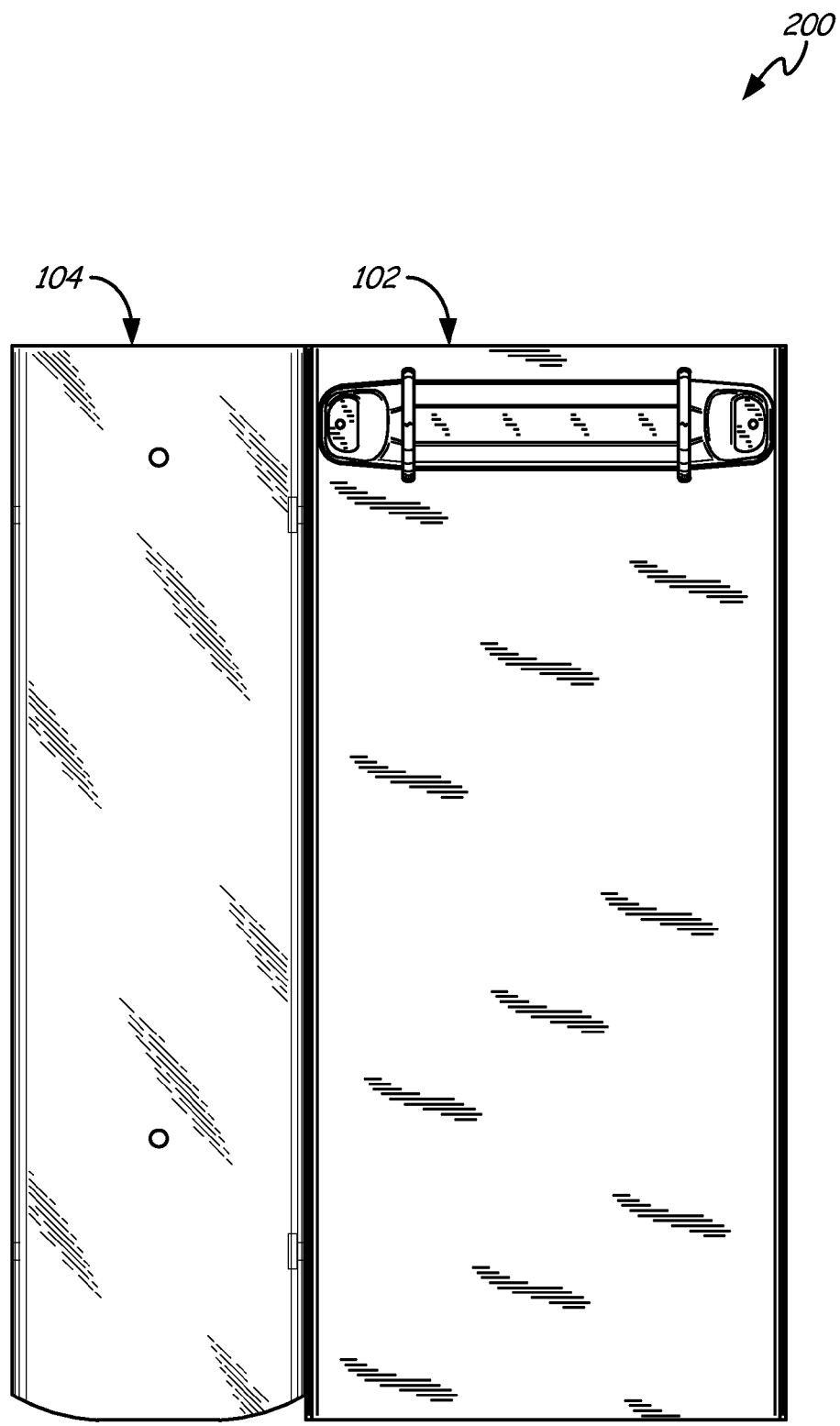
FIG. 9 illustrates a front view of the media display fixture illustrated in FIG. 8.
Figure 10:
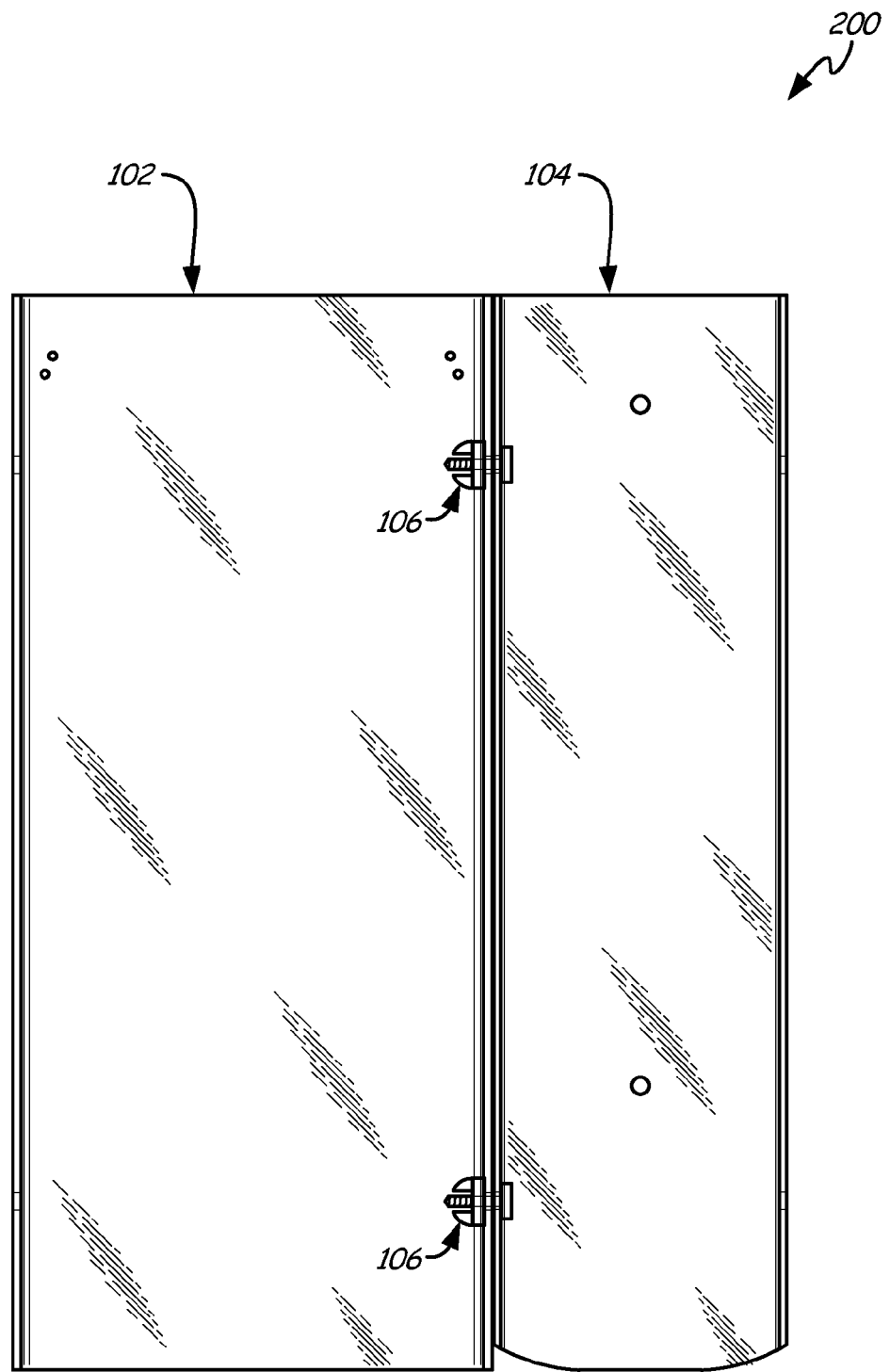
FIG. 10 illustrates a back view of the media display fixture illustrated in FIG. 8.

FIG. 8 is a perspective view of an assembled media display fixture or holder 200 in accordance with another embodiment, while FIGS. 9-14 illustrate elevation views of the assembled media display fixture or holder 200 including front, back, right side, left side, top and bottom views. Media display holder 200 includes the same main body 102, bracket 104 and pair of first fasteners 106 as media display holder 100.

FIGS. 8-14 illustrate how main body 102 and bracket 104 are designed to allow the bracket to be coupled to the other side of the main body then that which is illustrated in FIGS. 1-7 and therefore allow the bracket 104 to be mounted to the other side of the electronic kiosk. In both embodiments (FIGS. 1-7 and 8-14), the bottoms of main body 102 and bracket 104 remain at the bottom of media display fixture 100 and media display fixture 200.

Figures 11, 12:
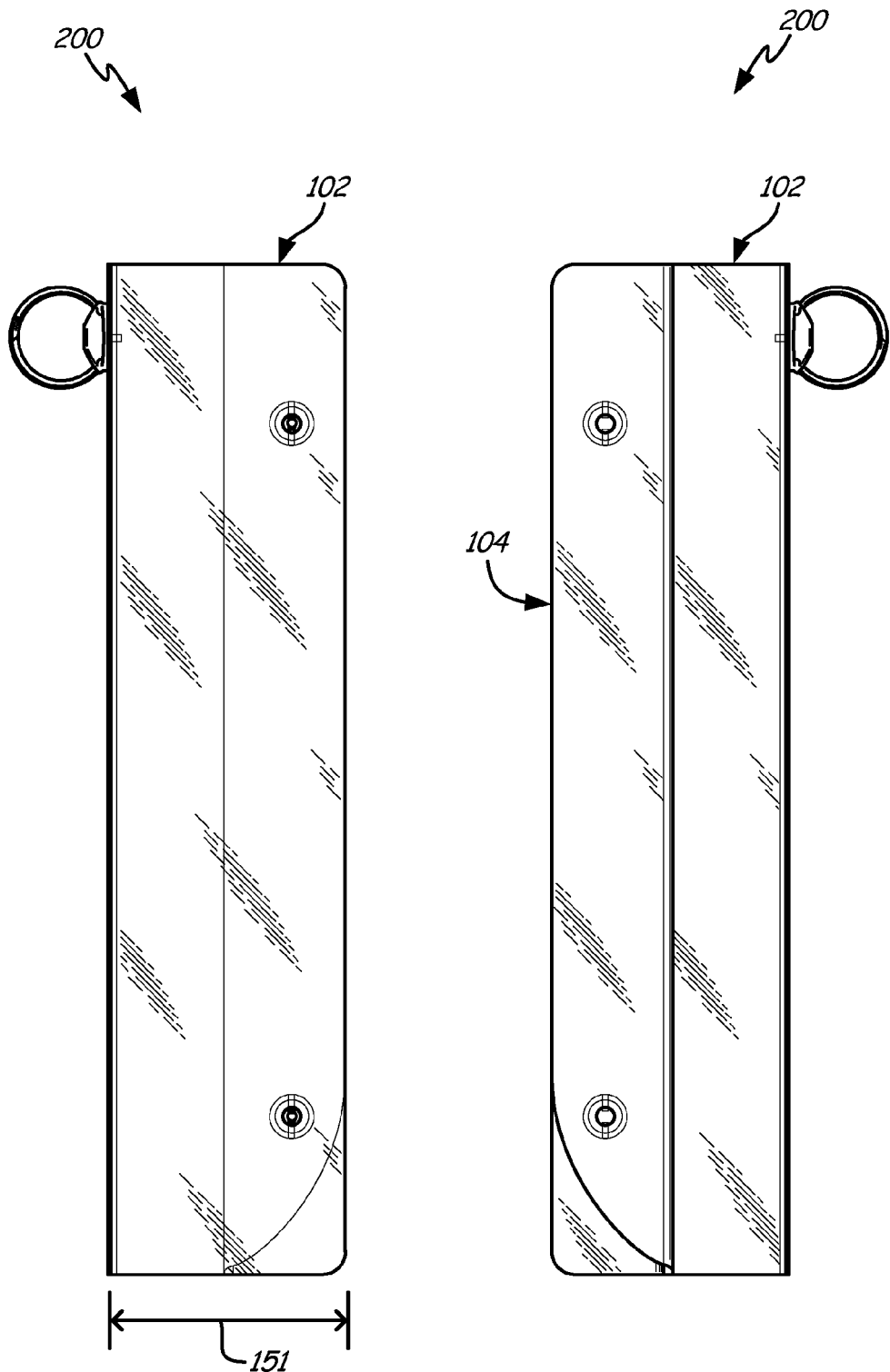
FIG. 11 illustrates a right side view of the media display fixture illustrated in FIG. 8.
FIG. 12 illustrates a left side view of the media display fixture illustrated in FIG. 8.
Figure 13:
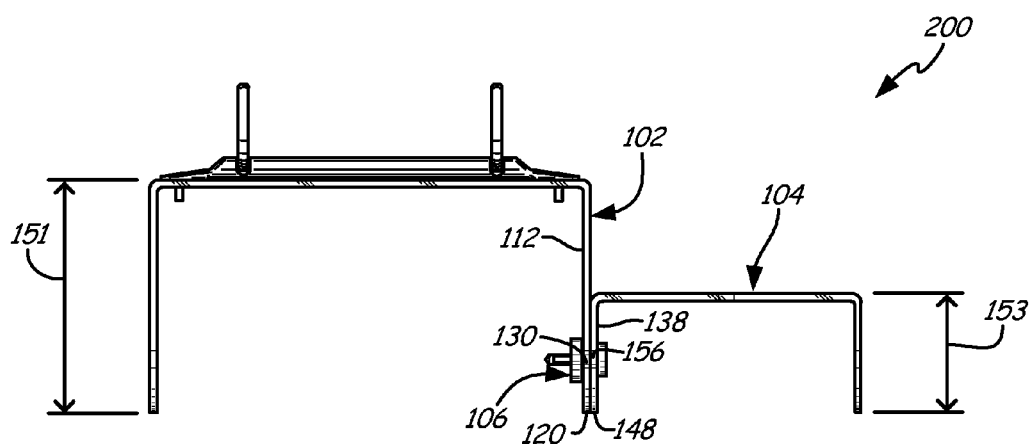
FIG. 13 illustrates a top view of the media display fixture illustrated in FIG. 8.
Figure 14:
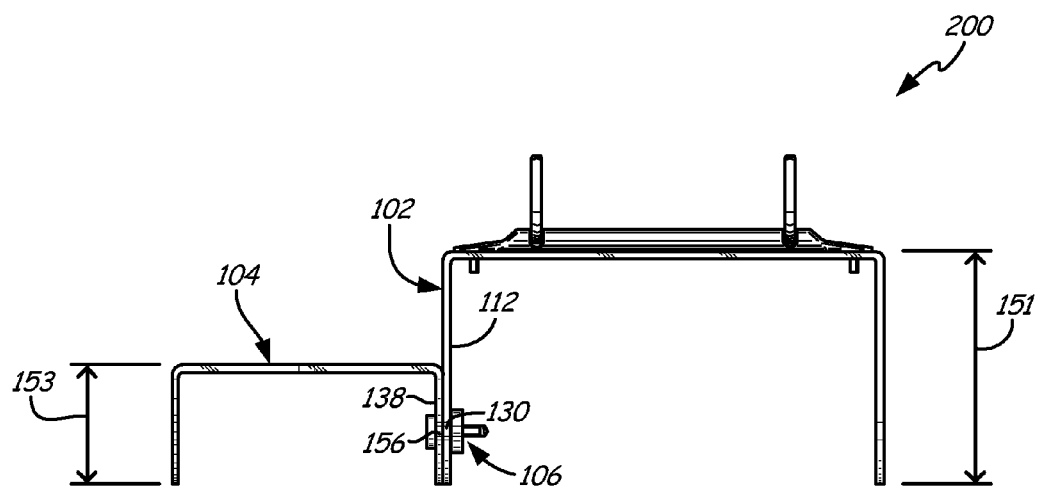
FIG. 14 illustrates a bottom view of the media display fixture illustrated in FIG. 8.

As illustrated in FIGS. 8-14, spaced apart apertures 156 in first side panel 138 of bracket 104 are positioned into alignment with spaced apart apertures 130 in second side panel 112 of main body 102. First fasteners 106, such as viking clips (i.e., plastic wing nuts that removably receive a round head screw), couple bracket 104 to main body 102 through apertures 130 and 156. Therefore, in FIGS. 8-14, surface 133 of first side panel 138 of bracket 104 directly couples to or engages with surface 103 of second side panel 112 of main body 102. In addition, left side edge 120 of main body 102 and a portion of right side edge 148 of support bracket 104 align with each other. As illustrated in FIGS. 8 and 12-13, main body 102 includes a width 151 and bracket 104 includes a width 153. The width 151 of main body 102 is greater than width 153 of bracket 104. With left side edge 120 and right side edge 148 being in alignment and the width 151 being greater than width 153, first side panel 138 of support bracket 104 only spans a portion of the width 151 of second side panel 112 of main body 102.

Figure 15:
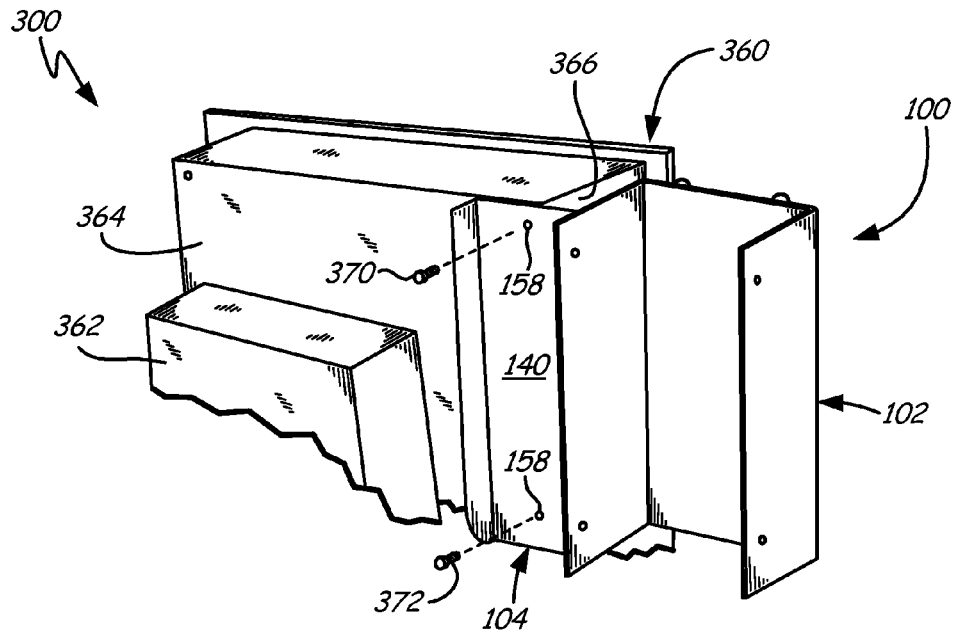
FIG. 15 illustrates a back perspective view of one embodiment of a media display fixture being mounted to a left side of an electronic kiosk.
Figure 16:
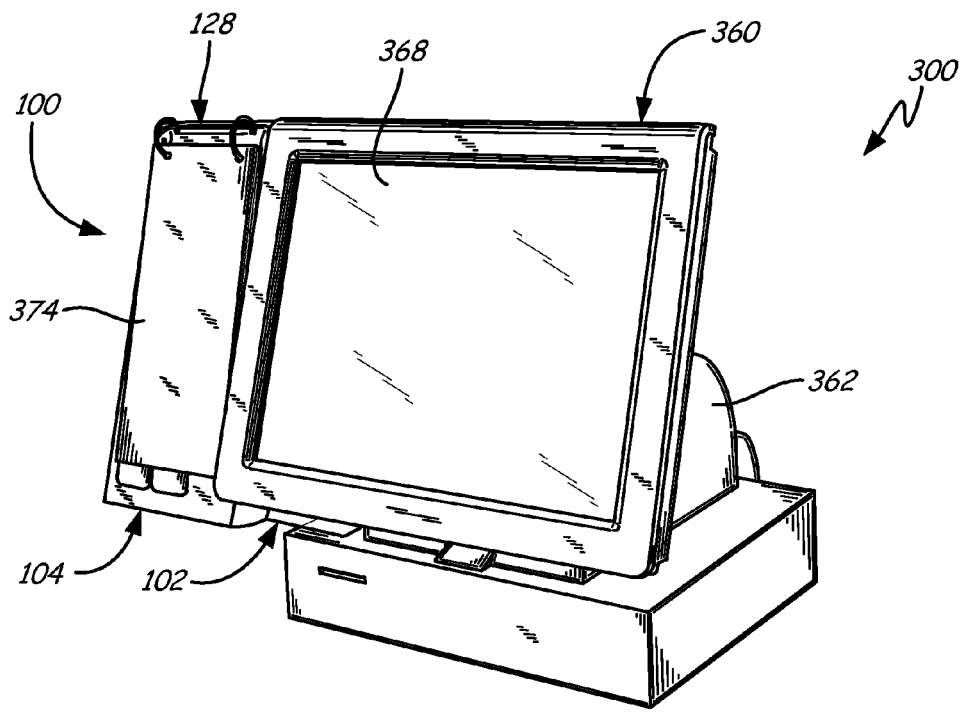
FIG. 16 illustrates a front perspective view of the media display fixture in FIG. 15 mounted to the electronic kiosk.
Figure 17:
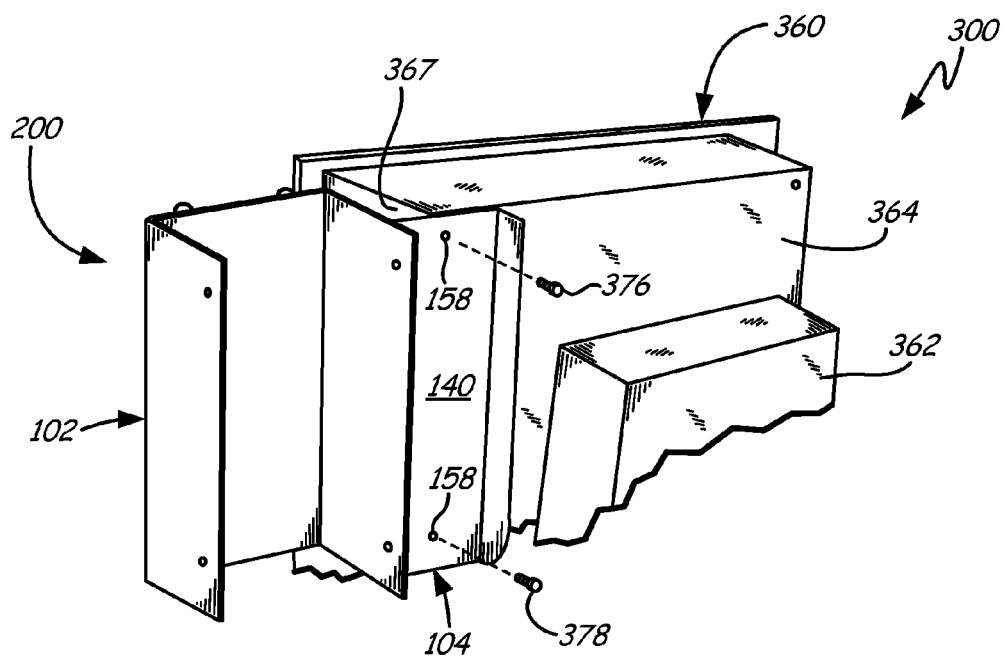
FIG. 17 illustrates a back perspective view of one embodiment of a media display fixture being mounted to a right side of an electronic kiosk.
Figure 18:
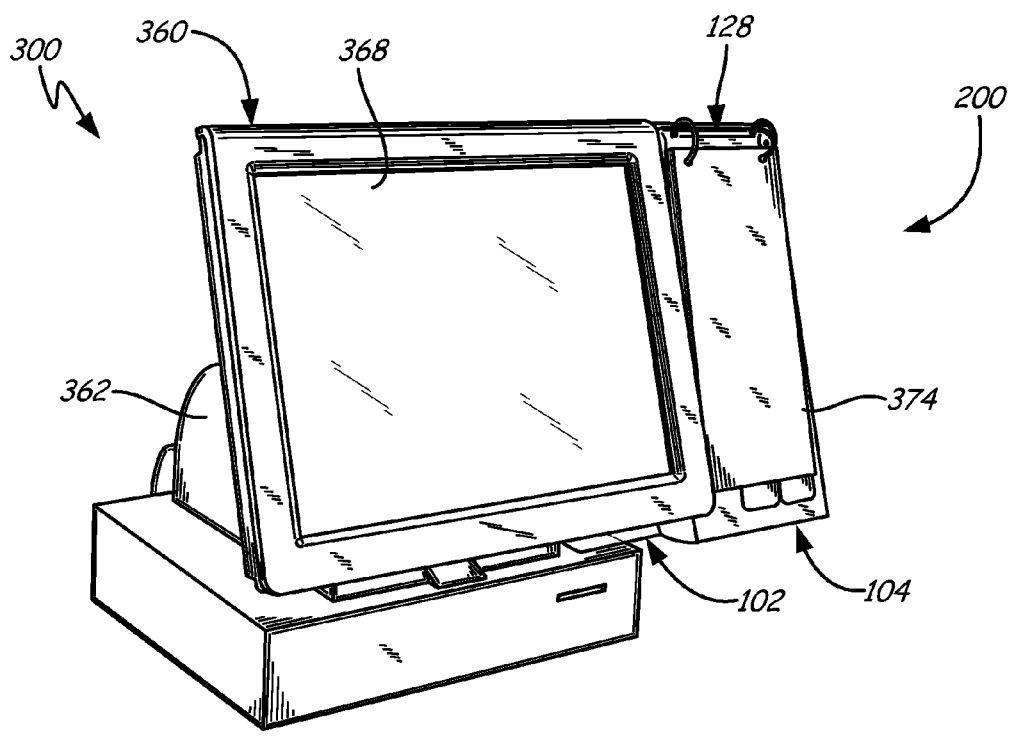
FIG. 18 illustrates a front perspective view of the media display fixture in FIG. 17 mounted to the electronic kiosk.

FIGS. 15-18 illustrate a method of displaying media on an electronic kiosk 300. In FIGS. 15-16, the method is illustrated using the coupling configuration of main body 102 and bracket 104 of media display fixture 100 illustrated in FIGS. 1-7. In FIGS. 17-18, the method is illustrated using the coupling configuration of main body 102 and bracket 104 of media display fixture 200 illustrated in FIGS. 8-14. Electronic kiosk 300 includes a kiosk display monitor 360, which is supported by a support arm 362. As illustrated, kiosk display monitor 360 includes a back surface 364, a left side surface 366 (FIG. 15) and a right side surface 367 (FIG. 17). In FIGS. 15-18, opposite back surface 364 is a kiosk display screen 368.

First, it is determined which side (the left or the right) of kiosk display monitor 360 the media display fixture should be located. Such a determination should be made based on the spacing of the electronic kiosk from other devices and systems. If the media display fixture is to be located on the left side of the kiosk display monitor 360, then media display fixture 100 illustrated in FIGS. 1-7 should be attached to the left side of the kiosk display monitor 360. If the media display fixture is to be located on the right side of the kiosk display monitor 360, then media display fixture 200 illustrated in FIGS. 8-14 should be attached to the right side of the kiosk display monitor 360.

For mounting media display fixture 100 to the left side of the kiosk display monitor 360, a pair of second fasteners including fastener 370 and fastener 372, which are fastened proximate to the left side of the back of the kiosk display monitor 360 are removed. As illustrated in FIG. 15, apertures 158 of bracket 104 are aligned with the areas where second fasteners 370 and 371 couple to the back of kiosk display monitor 360. Second fasteners 370 and 372 are inserted through apertures 158 and back into kiosk display monitor 360 to secure media display fixture 100 to the left side of kiosk display monitor 360.

After attachment of media display fixture 100, the rings of ring binder 128 are opened to receive pages of a flipbook 374. As illustrated in FIG. 16, media display fixture 100 is attached to the left side of kiosk display monitor 360 of electronic kiosk 300 and includes flipbook 374. Pages of flipbook 374 may include information for using electronic kiosk 300 and performing various functions or tasks.

For mounting media display fixture 200 to the right side of the kiosk display monitor 360, a pair of second fasteners 376 and 378, which are fastened proximate to the right side of the back of the kiosk display monitor 360 are removed. As illustrated in FIG. 17, apertures 158 of bracket 104 of media display fixture 200 are aligned with the areas where second fasteners 376 and 378 couple to the back of kiosk display monitor 360. Second fasteners 376 and 378 are inserted through apertures 158 and back into kiosk display monitor 360 to secure media display fixture 200 to the right side of kiosk display monitor 360.

After attachment of media display fixture 200, the rings of ring binder 128 are opened to receive pages of flipbook 374. As illustrated in FIG. 18, media display fixture 200 is attached to the right side of kiosk display monitor 360 of electronic kiosk 300 and includes flipbook 374. Pages of flipbook 374 may include information for using electronic kiosk 300 and performing various functions or tasks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A media display holder comprising:
    a main body comprising a first side portion, a second side portion, a central portion coupling the first side portion to the second side portion, a first, continuous surface extending along the first side portion, the second side portion and the central portion and an opposing second, continuous surface extending along the first side portion, the second side portion and the central portion, the central portion including a ring binder for receiving media for display;
    a bracket comprising a first side portion, a second side portion, a central portion coupling the first side portion to the second side portion, a first, continuous surface extending along the first side portion, the second side portion and the central portion of the bracket and an opposing second, continuous surface extending along the first side portion, the second side portion and the central portion of the bracket;
    at least one first fastener that directly couples one of the first and second side portions of the main body to one of the first and second side portions of the bracket such that the first surface of the main body is in contact with the first surface of the bracket; and
    at least one second fastener that directly couples the central portion of the bracket to a back surface of a kiosk display monitor of an electronic kiosk such that the first surface of the bracket is in contact with the back surface of the kiosk display monitor of the electronic kiosk.

2. The media display holder of claim 1, wherein each of the first side portion and the second side portion of the main body comprises at least one aperture extending between the first surface and the second surface of the main body and wherein each of the first side portion and the second side portion of the bracket comprises at least one aperture extending between the first surface and the second surface of the bracket.

3. The media display holder of claim 2, wherein the at least one aperture in the first side portion of the main body aligns with the at least one aperture in the second side portion of the bracket to receive the at least one fastener that directly couples the first side portion of the main body to the second side portion of the bracket.

4. The media display holder of claim 2, wherein the at least one aperture in the second side portion of the main body aligns with the at least one aperture in the first side portion of the bracket to receive the at least one fastener that directly couples the second side portion of the main body to the first side portion of the bracket.

5. The media display holder of claim 1, wherein the central portion of the bracket comprises at least one aperture extending between the first surface and the second surface of the bracket, the at least one aperture in the central portion of the bracket receives the at least one second fastener that directly couples the central portion of the bracket to the back surface of the kiosk display monitor.

6. The media display holder of claim 1, wherein the ring binder is riveted to the central portion of the main body.

7. The media display holder of claim 1, wherein each of the first side portion and the second side portion of the bracket comprise a width that is less than a width of the first side portion and the second side portion of the main body.

8. A media display fixture comprising:
a media display body having a single, continuous material and comprising:
a right side edge;
a first bend edge spaced apart from and substantially parallel with at least a portion of the right side edge such that the right side edge and the first bend edge define a first side panel;
a second bend edge spaced apart from and substantially parallel with the first bend edge such that the first bend edge and the second bend edge define a central panel;
a left side edge spaced apart from and substantially parallel with the second bend edge such that the second bend edge and the left side edge define a second side panel;
a support body having a single, continuous material comprising:
a right side edge;
a first bend edge spaced apart from and substantially parallel with at least a portion of the right side edge of the support body such that the right side edge of the support body and the first bend edge of the support body define a first side panel of the support body;
a second bend edge spaced apart from and substantially parallel with the first bend edge of the support body such that the first bend edge of the support body and the second bend edge of the support body define a central panel of the support body;
a left side edge spaced apart from and substantially parallel with at least a portion of the second bend edge of the support body such that the second bend edge of the support body and the left side edge of the support body define a second side panel of the support body; and
at least one fastener for directly coupling one of the first and second side panels of the media display body to one of the first and second side panels of the support body.

9. The media display fixture of claim 8, wherein the media display body comprises a ring binder riveted to the central panel of the media display body, the ring binder configured to support a flipbook.

10. The media display fixture of claim 8, wherein the central panel of the support body is mounted to a back surface of a kiosk display monitor of an electronic kiosk.

11. The media display fixture of claim 8, wherein the media display body comprises a top edge and a bottom edge that are substantially perpendicular to the right side edge, the first bend edge, the second bend edge and the left side edge of the media display body, the top edge defining a top and the bottom edge defining a bottom of the first side panel, the central panel and the second side panel of the media display body.

12. The media display fixture of claim 8, wherein the support body comprises a top edge that is substantially perpendicular to a portion of the right side edge, the first bend edge, the second bend edge and a portion of the left side edge of the support body, wherein the top edge of the support body defines a top of the first side panel, the central panel and the second side panel of the support body.

13. The media display fixture of claim 12, wherein the support body comprises a bottom edge that defines a bottom of the central panel of the support body, the right side edge of the support body intersecting with the bottom edge of the support body at the first bend edge of the support body and the left side edge of the support body intersecting with the bottom edge of the support body at the second bend edge of the support body.

14. The media display fixture of claim 8, wherein each of the first side panel and the second side panel of the support body comprises a width that is less than a width of the first side panel and the second side panel of the media display body.

15. A method of displaying media on an electronic kiosk, the method comprising:
obtaining a media display fixture comprising:
a main body including a first side portion, a second side portion, a central portion coupling the first side portion to the second side portion, a first continuous surface extending along the first side portion, the second side portion and the central portion and an opposing second, continuous surface extending along the first side portion, the second side portion and the central portion, the central portion of the main body including a ring binder for supporting a flipbook;
a bracket including a first side portion, a second side portion, a central portion coupling the first side portion of the bracket to the second side portion of the bracket, a first, continuous surface extending along the first side portion, the second side portion and the central portion of the bracket and an opposing second, continuous surface extending along the first side portion, the second side portion and the central portion of the bracket;
at least one first fastener;
determining whether to mount the media display fixture on a left side or a right side of a kiosk display monitor of the electronic kiosk;
directly coupling one of the first and second side portions of the main body to one of the first and second side portions of the bracket using the at least one first fastener depending on whether the media display fixture is to be mounted on the left side or the right side of the kiosk display monitor such that the first surface of the main body is in contact with the first surface of the bracket; and mounting the central portion of the bracket to a back surface of the kiosk display monitor using at least one second fastener such that the first surface of the bracket is in contact with the back surface of the kiosk display monitor.

16. The method of claim 15, wherein directly coupling one of the first and second side portions of the main body to one of the first and second side portions of the bracket using the at least one first fastener comprises:

aligning at least one aperture in one of the first and second side portions of the main body with at least one aperture in one of the first and second side portions of the bracket; and inserting the at least one first fastener into the aligned apertures.

17. The method of claim 15, wherein directly coupling one of the first and second side portions of the main body to one of the first and second side portions of the bracket using the at least one first fastener comprises aligning one of a right side edge and a left side edge of the bracket with one of a right side edge and a left side edge of the main body.

18. The method of claim 15, wherein mounting the central portion of the bracket to the back surface of the kiosk display monitor using the at least one second fastener comprises inserting the at least one second fastener through at least one aperture in the central portion of the bracket to mount the bracket to the back surface of the kiosk display monitor.

19. The method of claim 15, further comprising opening rings on the ring binder and inserting pages of the flipbook onto the rings.

\* \* \* \* \*